United States Patent [19]

Speckhart et al.

[11] Patent Number: 5,351,803
[45] Date of Patent: Oct. 4, 1994

[54] APPARATUS AND METHOD FOR RETRIEVING ARTICLES

[75] Inventors: Bernard S. Speckhart, Short Hills; Paul M. Berson, Jersey City; Ramon R. Duterte, Jr., Lodi, all of N.J.

[73] Assignee: White Conveyors, Inc., Kenilworth, N.J.

[21] Appl. No.: 47,851

[22] Filed: Apr. 15, 1993

[51] Int. Cl.$^5$ .............................................. B65G 43/08
[52] U.S. Cl. ........................... 198/464.3; 198/465.4; 198/468.8
[58] Field of Search ............... 198/464.3, 465.4, 468.8

[56] References Cited

U.S. PATENT DOCUMENTS

| | | | |
|---|---|---|---|
| Re. 24,961 | 4/1961 | Curtis | 118/316 |
| 421,999 | 2/1890 | Williams . | |
| 1,412,631 | 4/1922 | Righter . | |
| 1,861,600 | 6/1932 | Harrison . | |
| 1,998,109 | 4/1935 | Walter, Jr. | 211/1.5 |
| 2,449,669 | 9/1948 | Pohlers | 198/168 |
| 2,536,575 | 1/1951 | Seldin | 198/168 |
| 2,573,334 | 10/1951 | Hitz | 198/173 |
| 2,583,968 | 1/1952 | Rosseau | 263/6 |
| 2,599,615 | 6/1952 | Dahlberg | 198/213 |
| 2,645,186 | 7/1953 | Davis | 104/97 |
| 2,708,501 | 5/1955 | Boehm | 198/27 |
| 2,750,897 | 6/1956 | Davis | 104/96 |
| 2,751,091 | 6/1956 | Freeman | 214/11 |
| 2,846,049 | 8/1958 | Carlson | 198/130 |
| 2,861,676 | 11/1958 | Rasmussen et al. | 198/218 |
| 2,868,354 | 1/1959 | Harrison | 198/177 |
| 2,899,072 | 8/1959 | Weiss | 211/1.5 |
| 2,916,132 | 12/1959 | Leiser | 198/21 |
| 2,918,164 | 12/1959 | Austin et al. | 198/177 |
| 2,947,407 | 8/1960 | Wood | 198/66 |
| 2,952,351 | 9/1960 | Stone | 198/177 |
| 2,987,170 | 6/1961 | Hamilton | 198/213 |
| 2,998,136 | 8/1961 | Gerisch | 209/81 |
| 3,008,562 | 11/1961 | Ohrnell | 198/465.4 |
| 3,017,025 | 1/1962 | Stephen | 209/81 |
| 3,090,481 | 5/1963 | Biel et al. . | |
| 3,113,659 | 12/1963 | Oda et al. | 198/25 |

(List continued on next page.)

FOREIGN PATENT DOCUMENTS

| | | |
|---|---|---|
| 334127 | 7/1933 | Canada . |
| 690778 | 7/1964 | Canada .................................. 186/11 |
| 726529 | 1/1966 | Canada .................................. 198/22 |
| 1018472 | 10/1977 | Canada .................................. 203/18 |
| 1018931 | 10/1977 | Canada .................................. 203/18 |
| 1140139 | 11/1962 | Fed. Rep. of Germany . |
| 1205448 | 11/1965 | Fed. Rep. of Germany . |
| 2525070 | 12/1976 | Fed. Rep. of Germany . |
| 737325 | 6/1980 | U.S.S.R. . |
| 1221112 | 3/1986 | U.S.S.R. . |

OTHER PUBLICATIONS

Master–Veyor brochure, published by Speed Check Conveyor Co. Inc. Decatur, Ga., pp. 1–4.
Sorting Carousel brochure, published by Dunnewolt U.S.A. Inc., Dallas, Tex., pp. 1–4.
My–T–Veyor brochure, Model No. 830, published by My–T–Veyor, Oxford, Mich., pp. 1–3.
Sort–O–Veyor brochure, published by Speed Check Conveyor Co. Inc. Decatur, Ga., pp. 1–4.
Quick Assembly brochure, published by Natmar, Inc., Cincinatti, Ohio, pp. 1–2.
Controlling Hospital Garments, Wim Giezeman, Textile Rental, Jun. 1982, pp. 34–36, 38.

*Primary Examiner*—Joseph E. Valenza
*Attorney, Agent, or Firm*—Kenyon & Kenyon

[57] ABSTRACT

In an apparatus and method for retrieving articles from a conveyor, a carriage member moves bidirectionally along a column member between an upper position and a lower position. In the upper position, the carriage member receives an article released from the conveyor, while in the lower position, the article is manually removed from the carriage member. Upper and lower proximity sensors control movement of the carriage member in response to this receipt and removal of the article.

11 Claims, 3 Drawing Sheets

U.S. PATENT DOCUMENTS

| | | | |
|---|---|---|---|
| 3,124,236 | 3/1964 | Gerisch | 198/169 |
| 3,148,765 | 9/1964 | Weiss et al. | 198/213 |
| 3,151,730 | 10/1964 | Bünten | 198/38 |
| 3,152,682 | 10/1964 | Rutkovsky et al. | 198/38 |
| 3,164,245 | 1/1965 | Juengel | 198/129 |
| 3,171,536 | 3/1965 | Johnson | 198/465.4 |
| 3,178,012 | 4/1965 | Weiss et al. | 198/213 |
| 3,184,042 | 5/1965 | Rutkovsky et al. | 198/177 |
| 3,194,383 | 7/1965 | Kuwertz | 198/38 |
| 3,200,933 | 8/1965 | Schenk et al. | 198/38 |
| 3,247,952 | 4/1966 | Kozlosky | 198/173 |
| 3,403,767 | 10/1968 | Gerisch | 198/20 |
| 3,415,352 | 12/1968 | Gerisch | 198/38 |
| 3,422,950 | 1/1969 | Bachmann | 198/177 |
| 3,454,148 | 7/1969 | Harrison | 198/28 |
| 3,469,667 | 9/1969 | Gerisch | 193/40 |
| 3,511,359 | 5/1970 | Gerisch | 198/126 |
| 3,557,935 | 1/1971 | Gerisch | 198/38 |
| 3,580,378 | 5/1971 | Pedersen | 198/25 |
| 3,581,887 | 6/1971 | Radutsky et al. | 209/73 |
| 3,622,000 | 11/1971 | McClenny | 209/121 |
| 3,684,078 | 8/1972 | Nielsen | 198/33 |
| 3,707,925 | 1/1973 | Byrnes, Sr. | 104/167 |
| 3,786,911 | 1/1974 | Milazzo | 198/219 |
| 3,799,318 | 3/1974 | Dekoekkoek | 198/26 |
| 3,917,112 | 11/1975 | Willis et al. | 221/1 |
| 3,942,340 | 3/1976 | Kirkby | 68/3 R |
| 3,961,699 | 6/1976 | Hirsch | 198/26 |
| 4,018,327 | 4/1977 | Goodman et al. | 198/723 |
| 4,022,338 | 5/1977 | Laursen | 214/89 |
| 4,027,598 | 6/1977 | Swilley | 104/162 |
| 4,036,365 | 7/1977 | Rosenfeld | 209/73 |
| 4,180,152 | 12/1979 | Sefcik | 198/377 |
| 4,214,663 | 7/1980 | Schopp et al. | 209/552 |
| 4,239,435 | 12/1980 | Weiss et al. | 414/136 |
| 4,303,503 | 12/1981 | de Mimerand et al. | 209/3.3 |
| 4,763,773 | 8/1988 | Kawarabashi et al. | 198/464.3 |
| 4,817,778 | 4/1989 | Davidson | 198/346.1 |
| 4,875,416 | 10/1989 | Duce | 104/167 |
| 4,903,819 | 2/1990 | Heinold et al. | 198/465.4 |
| 4,907,699 | 3/1990 | Butcher et al. | 209/3.3 |
| 4,943,198 | 7/1990 | McCabe | 414/13 |
| 4,977,996 | 12/1990 | Duce | 198/349.95 |
| 4,991,719 | 2/1991 | Butcher et al. | 209/3.3 |
| 4,995,531 | 2/1991 | Summers | 221/75 |
| 5,000,309 | 3/1991 | Dooley | 198/680 |
| 5,005,691 | 4/1991 | Jennewein et al. | 198/465.4 |
| 5,113,995 | 5/1992 | Samurai | 198/468.8 |
| 5,141,094 | 8/1992 | Speckhart et al. | 198/349 |
| 5,154,275 | 10/1992 | Speckhart et al. | 198/416 |

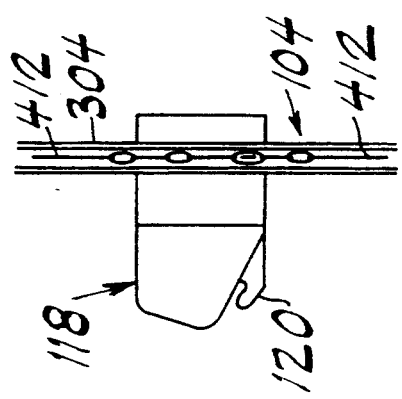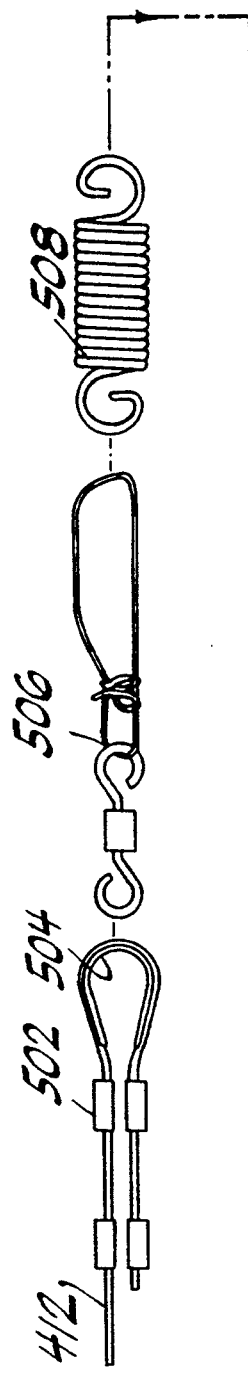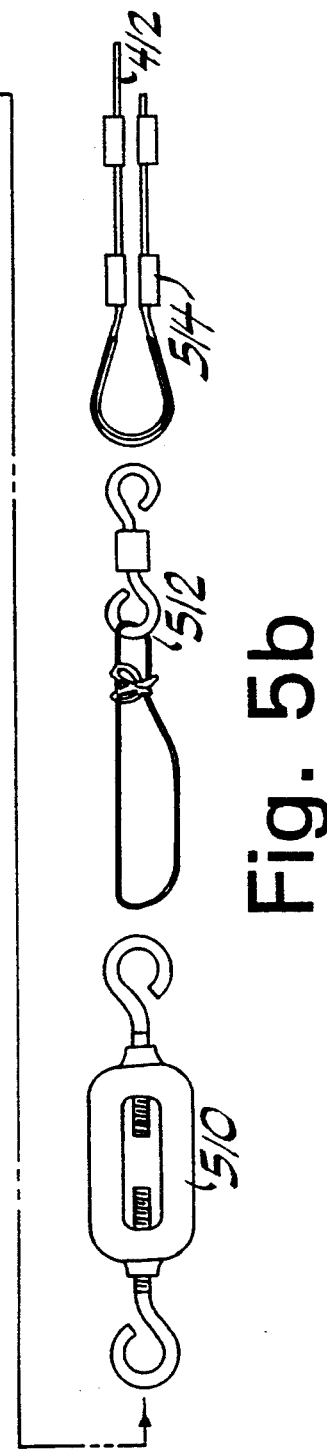

APPARATUS AND METHOD FOR RETRIEVING ARTICLES

BACKGROUND OF THE INVENTION

1. Field of the Invention

The present invention relates to an apparatus and method for retrieving articles and, in particular, to an apparatus and method for retrieving articles carried by a conveyor on hooked members.

2. Background Information

Apparatus for conveying articles and, in particular, articles supported on hooked members are used in various industries. For example, articles conveyed in an assembly line are frequently supported on hooked members, wherein the hooked members are carried by a conveyor.

In particular, the use of garment storage conveyors in, for example, dry cleaning stores, coat check rooms, employee dressing rooms and inventory storage areas is quite common because conveyors decrease the amount of physical labor associated with garment storage, as well as increase the level of control of the stored garments.

Quite frequently, however, at least portions of the garment conveyor are at an elevated location, thus making difficult manual removal of garments from the conveyor by a person at floor level.

U.S. Pat. No. 5,141,094 describes an apparatus for unloading articles from a conveyor. After garments on the conveyor are sorted into groups based upon, for example, the particular customer to which the garment belongs, all of the garments in a particular group are dropped onto a respective slide rail for subsequent removal and delivery to the customers. In particular, a control unit associates each of the conveyor positions with a particular group in which the garment at that position is contained. The control unit then controls the actuation of a solenoid to release the garments of a particular group onto a respective slide rail, as a function of conveyor position.

The apparatus described in U.S. Pat. No. 5,141,094, however, allocates garments to inclined slide rails as a function of a preselected grouping criteria. In addition, the use of a slide rail alone is not practical in instances in which a garment needs to be retrieved from the conveyor at a relatively high elevation. In particular, a large amount of rail would be required, taking-up a significant amount of floor space and possibly creating a safety hazard.

SUMMARY OF THE INVENTION

The present invention provides an efficient and safe apparatus and method for retrieving article(s) from a conveyor and, in particular, from a portion of a conveyor that is at a relatively high location.

A carriage member moves bidirectionally along a column member between an upper position at which the carriage member receives the article from the conveyor to a lower position at which the article can be manually removed from the carriage member. Upper and lower proximity sensors determine when the article has been received by the carriage member and when the article has been removed from the carriage member, respectively. The sensors control movement of the carriage member based upon these determinations. Upper and lower limit switches prevent upward movement of the carriage member past the receiving position and downward movement of the carriage member past the removal position, respectively.

A discharge selector controls the release of the article from the conveyor, as a function of a selected conveyor release position, and position signals from a position sensor. After the article is released from the conveyor, a discharge rail carries the article, which is supported on a hooked member, onto a hook of the carriage member. A rail stop prevents the article from exiting the discharge rail when the carriage member is not ready for the article, i.e., is not in the receiving position.

BRIEF DESCRIPTION OF THE DRAWINGS

FIG. 4b shows the cable assembly on the front side of the column member shown in FIG. 4a.

FIG. 5a is a rear partial view of the column member of the apparatus shown in FIGS. 1 and 2.

FIG. 5b shows the cable assembly on the rear side of the column member shown in FIG. 5a.

DETAILED DESCRIPTION

Figure 2:
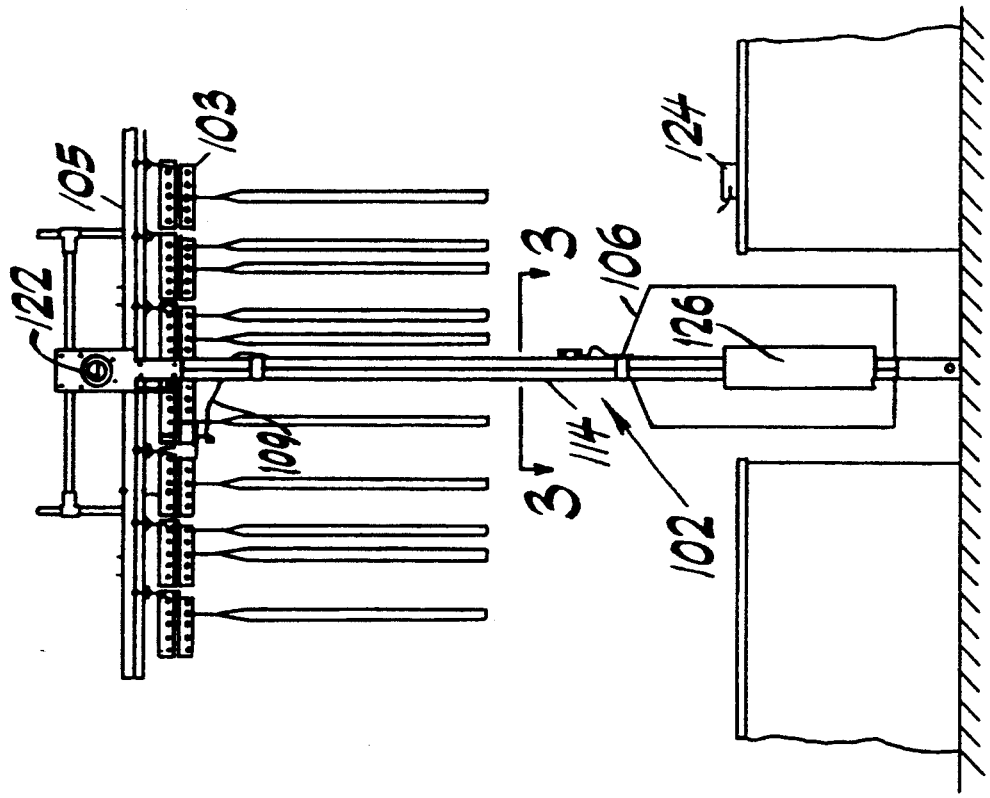
FIG. 2 is a side plan view of the conveying system of FIG. 1.
Figure 1:
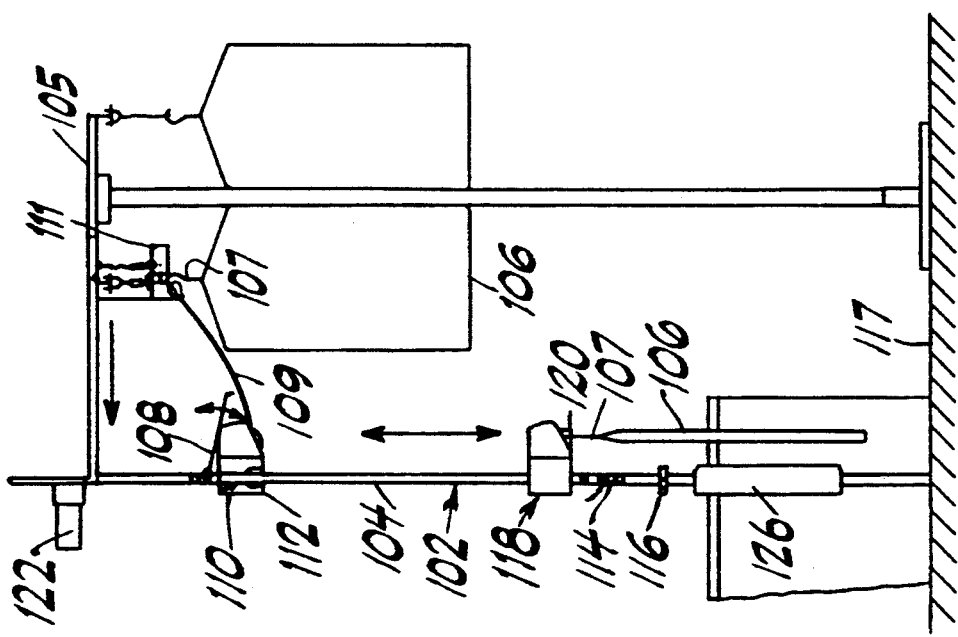
FIG. 1 is a front plan view of a conveying system employing the article retrieval apparatus according to the present invention.

Referring to FIGS. 1 and 2, there is shown two views of a conveying system employing the article retrieval apparatus according to the present invention. In the embodiment of the present invention illustrated, the retrieval apparatus 102 is used in a system for conveying garments supported on hooked members (hangers, for example).

In particular, the system for conveying garments supported on hooked members is preferably as shown and described in U.S. Pat. No. 5,141,094, entitled "Apparatus For Unloading Articles," issued on Aug. 25, 1992, which is assigned to the same assignee as is the present invention, and is hereby expressly incorporated by reference herein. In addition, the conveying system preferably includes a plurality of carrier assemblies 103 for releasably supporting hooked members as shown and described in U.S. Pat. No. 5,143,201, entitled "Carrier Assembly," issued on Sep. 1, 1992, which is assigned to the same assignee as is the present invention, and is hereby expressly incorporated by reference herein. However, it should be pointed out that the apparatus of the present invention can equally be adapted for use in other types of conveying systems and for conveying other types of articles supported on hooked members.

The retrieval apparatus 102 includes a column (shaft) member 104, which is preferably vertically oriented. An upper portion of the column member 104 is coupled to the conveyor 105 from which one or more garments 106 supported on hooked member(s) 107 is to be released.

U.S. Pat. No. 5,141,094 describes the actual garment release mechanism 111 of the conveying system. In particular, as the conveyor moves, a position sensor transmits output signals as consecutive positions of the conveyor pass the sensor. A control unit actuates a solenoid to release a hooked member from its latch when a predetermined number of signals have been received by the control unit, i.e., when a garment at a corresponding predetermined conveyor position is to be released.

According to the principles of the present invention, the particular conveyor position is selected, on any desired basis, at the time of retrieval, as explained further below. Moreover, each of the selected garments is released onto the same sloping discharge rail 109, which is coupled to the conveyor as shown and described in U.S. Pat. No. 5,141,094.

Below the conveyor 106, a rail stop 108 is hingeably coupled to the column member 104. A relatively short distance below the rail stop 108, an upper limit switch 110 is connected to the column member 104. Beneath the upper limit switch 110 is an upper proximity sensor 112, coupled to the column member 104.

A lower limit switch 114 is likewise connected to a lower portion of the column member 104. Beneath the lower limit switch 114 is a lower proximity sensor 116, coupled to the column member 104. The base of the column member 104 is mounted to the floor (ground) 117 for support.

A carriage member 118 is coupled for bidirectional vertical movement along the column member 104 between the upper limit switch 110 and the lower limit switch 114. The carriage member 118 has a hook 120 at its outer, lower portion for receiving, preferably, a single hooked member 107 holding one or more garments 106.

Figure 4A:
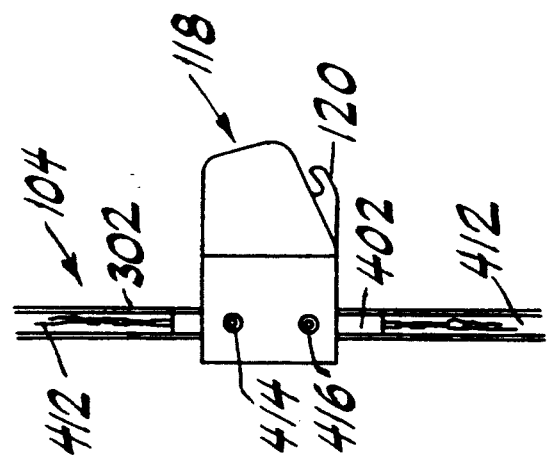
FIG. 4a is a front partial view of the column member of the apparatus shown in FIGS. 1 and 2.
Figure 3:
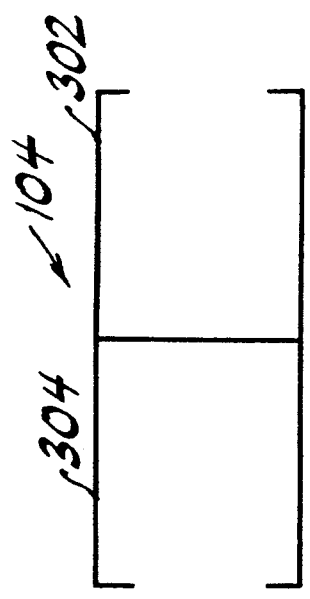
FIG. 3 is a top cross-sectional view of the column member of the apparatus shown in FIGS. 1 and 2.

As shown in the cross-sectional view of FIG. 3, taken along line 3—3 in FIG. 2, the column member 104 is preferably structured as back-to-back sections of flanged channel steel 302, 304. As shown in FIGS. 4a and 5a, cable extends through the front and rear channel sections 302 and 304, respectively, in order to control movement of the carriage member 118, as further described below.

Figure 4B:
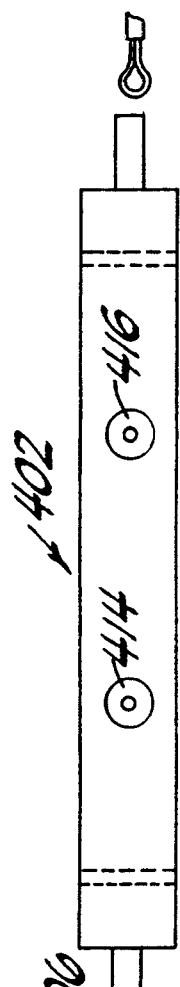

The cable assembly in the front channel section 302 is shown in greater detail in FIG. 4b. The two sides of a track guide 402 are coupled to respective splice members 404 (only one shown in full) through respective roll pins 406. Each splice member 404 is, in turn, coupled to a swivel member 408 which is, in turn, coupled to a crimp member 410. A nylon coated cable 412 extends outwardly from each of the crimp members 410.

The track guide 402 is fastened to the carriage member 118 at points 414 and 416. As such, the cable 412 controls vertical movement of the track guide 402 and, thus, the carriage member 118 along the column member 104.

The cable assembly in the rear channel section 304 is shown in greater detail in FIG. 5b. Identifying components from left to right in FIG. 5b, i.e., from top to bottom in FIG. 5a, the cable 412 is connected to a crimp member 502. A cable shield portion 504 of the crimp member 502 is coupled to a swivel member 506 which is, in turn, coupled to a tension spring 508. The tension spring 508 is further coupled to a turnbuckle member 510 which is, in turn, coupled to another swivel member 512. Finally, the swivel member 512 is coupled to another crimp member 514, at which point the cable 412 resumes.

The cable 412 extends along the column member 104 from the top of the cable assembly in the front channel section 302, as shown in FIGS. 4a and 4b, over a drive pulley mounted to a top portion of the column member 104. The drive pulley is closely coupled to a drive motor (and bidirectional motor control circuitry) 122 (shown in FIGS. 1 and 2), which would be well understood by those skilled in the art. The drive motor 122 operates the drive pulley under the control of a discharge selector 124 (shown in FIG. 2) to which the drive motor 122 is electrically coupled. From the drive pulley, the cable 412 extends to the top of the cable assembly in the rear channel section 304, as shown in FIGS. 5a and 5b.

The cable 412 resumes at the bottom of the cable assembly in the rear channel section 304, as shown in FIGS. 5a and 5b, and extends to an idler pulley mounted to a bottom portion of the column member 104. For protection purposes, the idler pulley may be surrounded by a cover 126 (shown in FIGS. 1 and 2). From the idler pulley, the cable 412 extends to the bottom of the cable assembly in the front channel section 302, as shown in FIGS. 4a and 4b. In this manner, a complete loop is formed around the column member 104.

In operation, when retrieval of one or more garments 106 from the conveyor 105 is desired, the corresponding conveyor latch position is selected either by an operator using a keypad or from a remote computer such as a cash register or customer data base register. Upon selection, the microprocessor-programmed electronic discharge selector 124 transmits an activation signal to the conveyor motor which causes the conveyor to move solely in the direction indicated by the horizontal arrow in FIG. 1. The discharge selector 124 may be a version of the Model 540 Keyboard Control, manufactured by White Conveyors, Inc. of Kenilworth, N.J.

When the discharge selector 124 determines, based upon signals received from the position sensor (as described above), that the selected latch position has reached the release mechanism 111, the discharge selector 124 transmits an activation signal to the release mechanism 111 in order to release the garment(s) held in the selected latch position, onto the discharge rail 109. The garment(s) slides down the rail 109 onto the hook 120 of the carriage member 118, which is initially in a receiving position at an upper portion of the column member 104, as shown in FIG. 1.

In the receiving position, the carriage member 118 is bounded on its upper side by the upper limit switch 110, which prevents further upward movement. In addition, in the receiving position, the carriage member 118 displaces the rail stop 108 from its rest position, i.e., in contact with the discharge rail 109, to a position above the discharge rail 109, i.e., sufficiently separated from the discharge rail 109 to allow a hooked member 107 supporting one or more garments 106 to pass the rail stop 108 when sliding down the discharge rail 109.

The arrival of the garment 106 is detected by the upper proximity sensor 112, which then activates the drive motor 122 to lower the carriage member 118, through operation of the two pulleys and cable 412, to a removal position at a lower portion of the column member 104. The downward movement of the carriage member 118 ceases upon its contact with the lower limit switch 114. In the removal position, the garment 106 can be easily manually removed from the hook 120. The removal of the garment 106 is detected by the lower proximity sensor 116, which then activates the drive motor 122 to return the carriage member 118 to the receiving position in order to accept the next garment to be retrieved.

Preferably, the discharge selector 124 continuously calls for conveyor latch positions corresponding to garments to be retrieved. If more than one latch position is requested, the discharge selector 124 places the requested latch positions in a queue. The requested latch positions in the queue are consecutively serviced until the queue is empty, such that garments 106 are released from the conveyor 105 onto the discharge rail 109 even if the carriage member 118 is not currently in its receiving (upper) position. In such a situation, the rail stop 108 is in its rest position (i.e., is in contact with the discharge rail 109) and, thus, prevents the garment(s) 106 from exiting the discharge rail 109. When the carriage member 118 returns to the receiving position, it lifts the rail stop 108, causing the garment(s) 106 to slide down the remaining portion of the discharge rail 109 onto the hook 120 of the carriage member 118.

What is claimed is:

1. An apparatus for receiving at least one article from a conveyor wherein the conveyor includes a release mechanism for releasing the article in response to a release signal, comprising:
   a column member coupled to the conveyor;
   a carriage member coupled to the column member for movement along the column member between a first position for receiving the article from the conveyor and a second position spaced from the first position;
   a discharge rail coupled to the conveyor for transporting the article, released from the conveyor, to the carriage member;
   a stop rail hingeably coupled to the column member for movement between a third position spaced from the discharge rail when the carriage member is in the first position and fourth position in contact with the discharge rail for preventing transportation of the article along the discharge rail;
   a drive mechanism coupled to the carriage member for controlling movement of the carriage member between the first and second positions;
   a first sensor electrically coupled to the drive mechanism for detecting when the article has been received by the carriage member and for transmitting a first signal to the drive mechanism for moving the carriage member from the first position to the second position when the receipt of the article has been detected; and
   a second sensor electrically coupled to the drive mechanism for detecting when the article has been removed from the carriage member and for transmitting a second signal to the drive mechanism for moving the carriage member from the second position to the first position when removal of the article has been detected.

2. The apparatus according to claim 1, wherein the column member is vertically oriented and the first position is above the second position.

3. The apparatus according to claim 2, wherein the first sensor is coupled to the column member, and the second sensor is coupled to the column member below the first sensor.

4. The apparatus according to claim 1, wherein the article is a garment.

5. The apparatus according to claim 4, wherein the garment is supported on a hooked member.

6. The apparatus according to claim 5, wherein the carriage member includes a hook for receiving the hooked member.

7. The apparatus according to claim 1, further comprising a release control unit for transmitting the release signal to the release mechanism as a function of a position of the article on the conveyor.

8. The apparatus according to claim 7, wherein the article position is selected by an operator.

9. The apparatus according to claim 7, further comprising a position sensor coupled to the release control unit for detecting conveyor positions upon movement of the conveyor and for transmitting a position signal to the release control unit upon detection of each conveyor position.

10. The apparatus according to claim 9, wherein the release control unit transmits the release signal as a function of the position signals from the position sensor.

11. The apparatus according to claim 1, further comprising:
   a first limit switch mounted at the first position of the column member for preventing the carriage member from moving past the first position when moving from the second position; and
   a second limit switch mounted at the second position of the column member for preventing the carriage member from moving past the second position when moving from the first position.

* * * * *